Aug. 18, 1936.  W. FELDERMANN  2,051,033
MOTOR MOUNTING
Original Filed Sept. 1, 1934
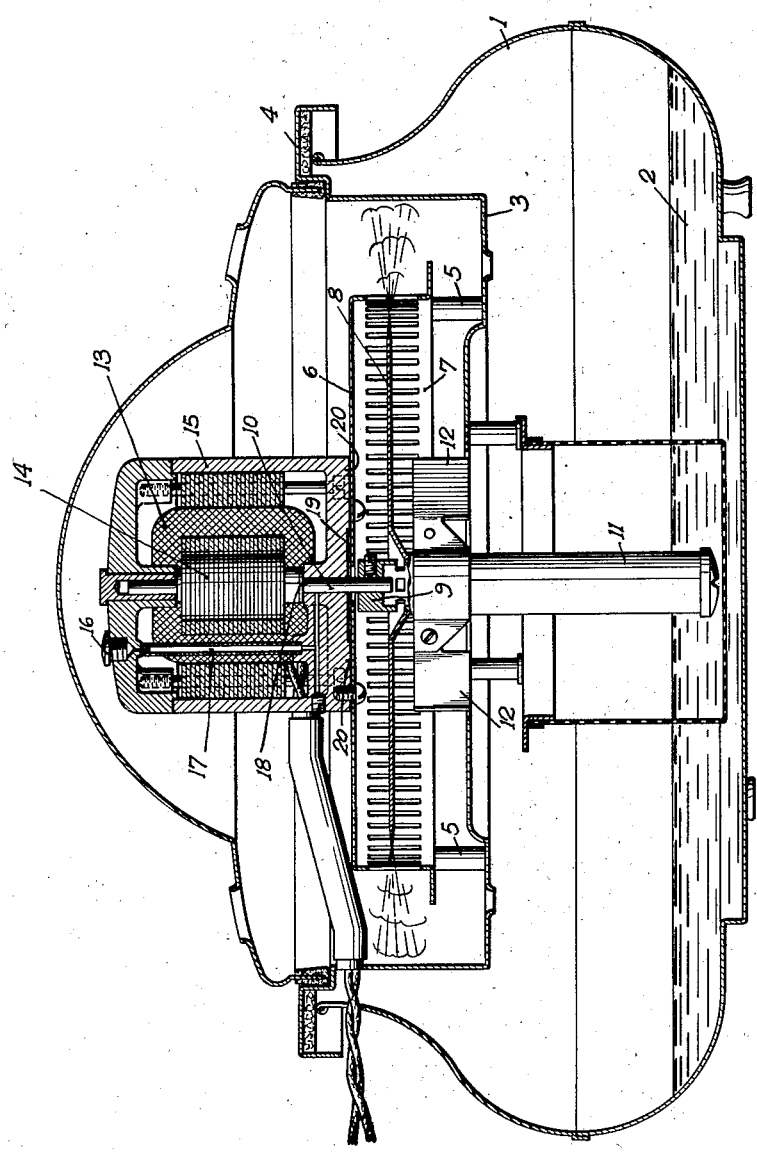
INVENTOR.
WILLIAM FELDERMANN,
BY Duell & Kane.
ATTORNEYS.

Patented Aug. 18, 1936

2,051,033

UNITED STATES PATENT OFFICE 2,051,033

MOTOR MOUNTING

William Feldermann, South Orange, N. J.

Application September 1, 1934, Serial No. 742,513
Renewed June 19, 1936

2 Claims. (Cl. 172—36)

This invention relates to a new and improved motor mounting. It is an object of the invention to provide a mounting for an electric motor or the like which is particularly designed to dissipate heat incident to the operation of such motor.

It is a further object to provide a mounting which is simple and unitary in construction, and which can be readily assembled by relatively unskilled labor and thereafter function over long periods of time with freedom from mechanical difficulties.

With these and other objects in mind, reference is had to the attached drawing, which represents a side elevation in cross-section of one embodiment of the motor mounting as employed in connection with a humidifying apparatus.

In the drawing the reference numeral 1 represents a humidifier base or body member containing water or other liquid 2 to be humidified. Positioned within the body member and above the bulb level of the liquid is a pan 3, which is supported by a shoulder portion 4 which extends over the upper edge of the body member. Positioned within said pan by means of leg portions 5 is a disk 6 provided with a downwardly extending perforated apron 7. Beneath said disk in line with the perforations in said apron is a horizontally mounted diffusing member 8, which is axially secured at 9 to a motor shaft 10. Likewise carried by said motor shaft and positioned beneath said diffusing member is a hollow tubular pump 11, the lower end of which is immersed in the liquid. Fan blades 12 may be secured to the outer surface of said pump below the diffusing member to provide a current of air flowing downwardly through the perforations in the apron 7. the motor for driving said humidifier may be of either the brush or induction type, and is formed with a field 13 and a rotor 14. Because of the use to which it is put, the motor must necessarily be completely enclosed, so that moisture does not penetrate the field or armature winding and thus short-circuit the motor. With this in mind, a casing 15 encircles the motor, completely enclosing the same, so that there is no opening through which moisture can enter and damage the motor. A screw-threaded oil cap 16 is likewise provided leading through an oil tube 17 which conveys the lubricant to the lower bearing 18 upon which the weight of the rotor rests during the operation of the motor.

It is obvious that in a motor construction such as has been described, the heat generated within the motor during its operation will have no means of escape other than the casing, and will, therefore, tend to raise the temperature of the latter to a point where the operating efficiency of the motor is impaired and, in fact, the windings themselves would become damaged due to a burning of the insulation. With this in mind, and in order to dissipate and cool away the heat stored therein, said casing is secured to the upper surface of the disk 6. This disk should preferably be made of copper or other metal of comparatively great heat conductivity, so that it can quickly absorb and carry away the heat from the motor casing.

In order to facilitate the quick dissipation of heat, it is essential that a comparatively large area of surface contact be provided at the point of juncture of said disk and motor casing. It is at the same time, however, important that the casing and disk may be joined together without resorting to any delicate operations of alignment. In order to make this possible, the lower surface of the motor casing is provided with a circular recess 19 adjacent the motor shaft, leaving an annular ring 20 adjacent the periphery of the lower surface of the motor casing for contact with the disk. This ring, as is shown in the drawing, is preferably of substantial width, so that the greatest possible surface area is afforded for contact with the disk member.

It is apparent from the foregoing that the type of motor mounting just described, especially when used in connection with a humidifier or the like, attains a high degree of efficiency, due in part to the great conductivity of the disk 6, and further to the cooling action of the moisture sprayed along the inner surface of the apron 7 from the diffusing member 8. Likewise the fan blades 12, in causing a current of air to pass over the apron also contribute to the cooling of the disk, and this likewise helps to dissipate the heat created by the motor.

Thus, among others, the several objects of the invention as specifically afore noted, are achieved. Obviously, numerous changes in construction and rearrangement of the parts might be resorted to without departing from the spirit of the invention as defined by the claims.

Having thus fully described the invention, what is claimed as new and desired to be protected by Letters Patent is:

1. A motor mounting including, in combination, a motor casing adapted to hold a motor for rotation about a vertical axis, the bottom portion of said casing being formed with an annular heat transfer ridge near its outer edge, a disc of substantially greater diameter than said motor casing and formed of a material having a higher degree of heat conductivity than the latter, secured in intimate contact with said heat transfer portion of the casing to effect a cooling of said motor mounting, a depending perforated apron portion formed at the periphery of said disc, and means actuated by said motor and disposed beneath said disc but in line with said depending apron portion to cause a mixture of moisture and air to come in contact therewith and thereby effect a cooling of said motor mounting.

2. As an article of manufacture, a motor casing formed of a material having a relatively low degree of heat conductivity, a motor disposed within said casing on a vertical axis, a horizontally disposed disc secured to the bottom of said motor casing and having a perforated apron depending from its periphery, said disc being formed of a material having a relatively high degree of heat conductivity, a horizontally disposed diffusing member of a lesser diameter than said disc rotatably coupled to said motor at a point below said disc but within said apron portion thereof and adapted to cause a spray of liquid to come in contact with said apron portion of said disc to cool the same, and a fan blade positioned below said diffusing member and also rotated by said motor to cause a current of air to pass said depending apron portion of said disc and thereby further cool the same.

WILLIAM FELDERMANN.